(12) United States Patent
Sargsyan et al.

(10) Patent No.: US 12,205,609 B1
(45) Date of Patent: Jan. 21, 2025

(54) GENERATING PARALLEL DATA FOR REAL-TIME SPEECH FORM CONVERSION

(71) Applicant: KRISP TECHNOLOGIES, INC., Berkeley, CA (US)

(72) Inventors: Stepan Sargsyan, Yerevan (AM); Artur Kobelyan, Yerevan (AM); Levon Galoyan, Yerevan (AM); Kajik Hakobyan, Yerevan (AM); Rima Shahbazyan, Yerevan (AM); Daniel Baghdasaryan, Yerevan (AM); Ruben Hasratyan, Yerevan (AM); Nairi Hakobyan, Yerevan (AM); Hayk Aleksanyan, Yerevan (AM); Tigran Tonoyan, Yerevan (AM); Aris Hovsepyan, Vanadzor (AM)

(73) Assignee: KRISP TECHNOLOGIES, INC., Berkeley, CA (US)

(*) Notice: Subject to any disclaimer, the term of this patent is extended or adjusted under 35 U.S.C. 154(b) by 0 days.

(21) Appl. No.: 18/775,199

(22) Filed: Jul. 17, 2024

Related U.S. Application Data

(60) Provisional application No. 63/528,251, filed on Jul. 21, 2023.

(51) Int. Cl.
*G10L 21/055* (2013.01)
*G10L 25/30* (2013.01)

(52) U.S. Cl.
CPC ............ *G10L 21/055* (2013.01); *G10L 25/30* (2013.01)

(58) Field of Classification Search
CPC .............................. G10L 21/055; G10L 25/30
(Continued)

(56) References Cited

U.S. PATENT DOCUMENTS 6,385,586 B1  5/2002  Dietz
10,127,921 B2 * 11/2018 Iyer .......................... H04R 3/02
(Continued)

FOREIGN PATENT DOCUMENTS

CN       113345419 A        9/2021

OTHER PUBLICATIONS

A. Kashkin, I. Karpukhin, S. Shishkin, "HIFI-VC: High Quality ASR-based Voice Conversion", 12th ISCA Speech Synthesis Workshop (SSW2023), Aug. 26-28, 2023, pp. 100-105, Grenoble, France.
(Continued)

*Primary Examiner* — Thuykhanh Le
(74) *Attorney, Agent, or Firm* — Arluys IP, P.C

(57) ABSTRACT

Techniques are described for generating parallel data for real-time speech form conversion. In an embodiment, based at least in part on input speech data of an original form, a speech machine learning (ML) model generates parallel speech data. The parallel speech data includes the input speech data of the original form and temporally aligned output speech data of a target form different than the original form. Each frame of the input speech data temporally corresponds to the corresponding output speech frame of the target speech form and contains a same portion of the particular content. The techniques further include training a teacher machine learning model that is offline and is substantially larger than a student machine learning model for converting speech form. Transferring "knowledge" from the trained Teacher model for training the Production Student Model that performs the speech form conversion on an end-user computing device.

20 Claims, 9 Drawing Sheets

(58) Field of Classification Search
USPC .......................................................... 704/503
See application file for complete search history.

(56) References Cited

U.S. PATENT DOCUMENTS

| | | | | |
|---|---|---|---|---|
| 11,282,498 | B2* | 3/2022 | Deng | G10L 13/047 |
| 11,715,457 | B1 | 8/2023 | Golman | |
| 11,922,947 | B2* | 3/2024 | Li | G10L 15/04 |
| 12,002,458 | B1* | 6/2024 | Gao | G10L 15/22 |
| 12,125,496 | B1 | 10/2024 | Zhang | |
| 2004/0037439 | A1* | 2/2004 | Ise | G10L 21/02 |
| | | | | 381/94.2 |
| 2010/0005362 | A1* | 1/2010 | Ito | G10L 19/005 |
| | | | | 714/752 |
| 2016/0112811 | A1* | 4/2016 | Jensen | G10L 21/0232 |
| | | | | 381/17 |
| 2018/0174595 | A1 | 6/2018 | Dirac | |
| 2019/0051290 | A1* | 2/2019 | Li | G10L 15/063 |
| 2019/0104308 | A1* | 4/2019 | Nishida | H04N 19/14 |
| 2019/0124327 | A1* | 4/2019 | Kawai | H04N 19/192 |
| 2019/0244604 | A1* | 8/2019 | Masataki | G10L 15/183 |
| 2020/0021832 | A1* | 1/2020 | Kawai | H04N 19/61 |
| 2020/0126537 | A1* | 4/2020 | Guevara | G06N 3/045 |
| 2020/0175961 | A1 | 6/2020 | Thomson | |
| 2020/0327883 | A1* | 10/2020 | Yuan | G10L 15/144 |
| 2020/0334538 | A1* | 10/2020 | Meng | G10L 15/16 |
| 2020/0410976 | A1* | 12/2020 | Zhou | G06N 3/048 |
| 2021/0064826 | A1* | 3/2021 | Rajagopal | G06F 40/35 |
| 2021/0312902 | A1* | 10/2021 | Zhang | G10L 15/20 |
| 2021/0383789 | A1* | 12/2021 | Donahue | G06N 3/04 |
| 2022/0076657 | A1* | 3/2022 | Wang | G10L 13/033 |
| 2022/0208204 | A1* | 6/2022 | Sivaraman Narayanaswamy | |
| | | | | G10L 21/0272 |
| 2022/0310065 | A1* | 9/2022 | Rosenberg | G10L 15/16 |
| 2022/0335965 | A1* | 10/2022 | Sato | G10L 21/0272 |
| 2022/0343896 | A1* | 10/2022 | Tagliasacchi | G10L 25/30 |
| 2022/0358903 | A1 | 11/2022 | Serebryakov et al. | |
| 2023/0103382 | A1* | 4/2023 | Lu | G10L 15/197 |
| | | | | 704/232 |
| 2023/0197065 | A1* | 6/2023 | Mun | G10L 25/30 |
| | | | | 704/200 |
| 2023/0298565 | A1* | 9/2023 | Rosenberg | G10L 21/003 |
| | | | | 704/235 |
| 2023/0410824 | A1* | 12/2023 | Zhang | G10L 25/90 |
| 2024/0070453 | A1* | 2/2024 | Kim | G06N 3/08 |
| 2024/0070454 | A1* | 2/2024 | Guo | G06V 10/7792 |
| 2024/0098218 | A1* | 3/2024 | Nguyen | G10L 15/063 |
| 2024/0153484 | A1* | 5/2024 | Rosenberg | G10L 15/063 |
| 2024/0161764 | A1* | 5/2024 | Maikhuri | G10L 21/007 |
| 2024/0194206 | A1* | 6/2024 | Sokol | G10L 17/06 |
| 2024/0205140 | A1* | 6/2024 | Lokhandwala | H04L 45/24 |
| 2024/0274122 | A1* | 8/2024 | Wang | G06F 40/58 |
| 2024/0296335 | A1* | 9/2024 | Jandial | G06N 3/096 |
| 2024/0297959 | A1* | 9/2024 | Gao | G10L 21/013 |
| 2024/0304178 | A1* | 9/2024 | Rosenberg | G06F 21/6254 |
| 2024/0330609 | A1* | 10/2024 | Mishra | G06N 20/00 |
| 2024/0347070 | A1 | 10/2024 | Pfeifenberger | |
| 2024/0363135 | A1 | 10/2024 | Pfeifenberger et al. | |

OTHER PUBLICATIONS

S. Liu, Y. Cao, D. Wang, X. Wu, X. Liu, and H. Meng, "Any-to-Many Voice Conversion With Location-Relative Sequence-to-Sequence Modeling", IEEE/ACM Transactions on Audio, Speech, and Language Processing, vol. 29, pp. 1717-1728, 2021.

D. Felps, H. Bortfeld, R. Guitierrer-Osuna, "Foreign Accent Conversion in Computer Assisted Pronunciation Training", Speech Communication, vol. 51, Issue 10, 2009, pp. 920-932.

"PCT International Search Report" by the Intellectual Property Office of Philippines (PH) in Application No. PCT/US2024/038305, filed Jul. 17, 2024, mailed Nov. 1, 2024, 3 pages.

International Claims examined by the Intellectual Property Office of Philippines (PH) in Application No. PCT/US2024/038305, filed Jul. 17, 2024, 4 pages.

U.S. Appl. No. 18/775,232, filed Jul. 17, 2024, Non-Final Office Action mailed Nov. 4, 2024.

* cited by examiner

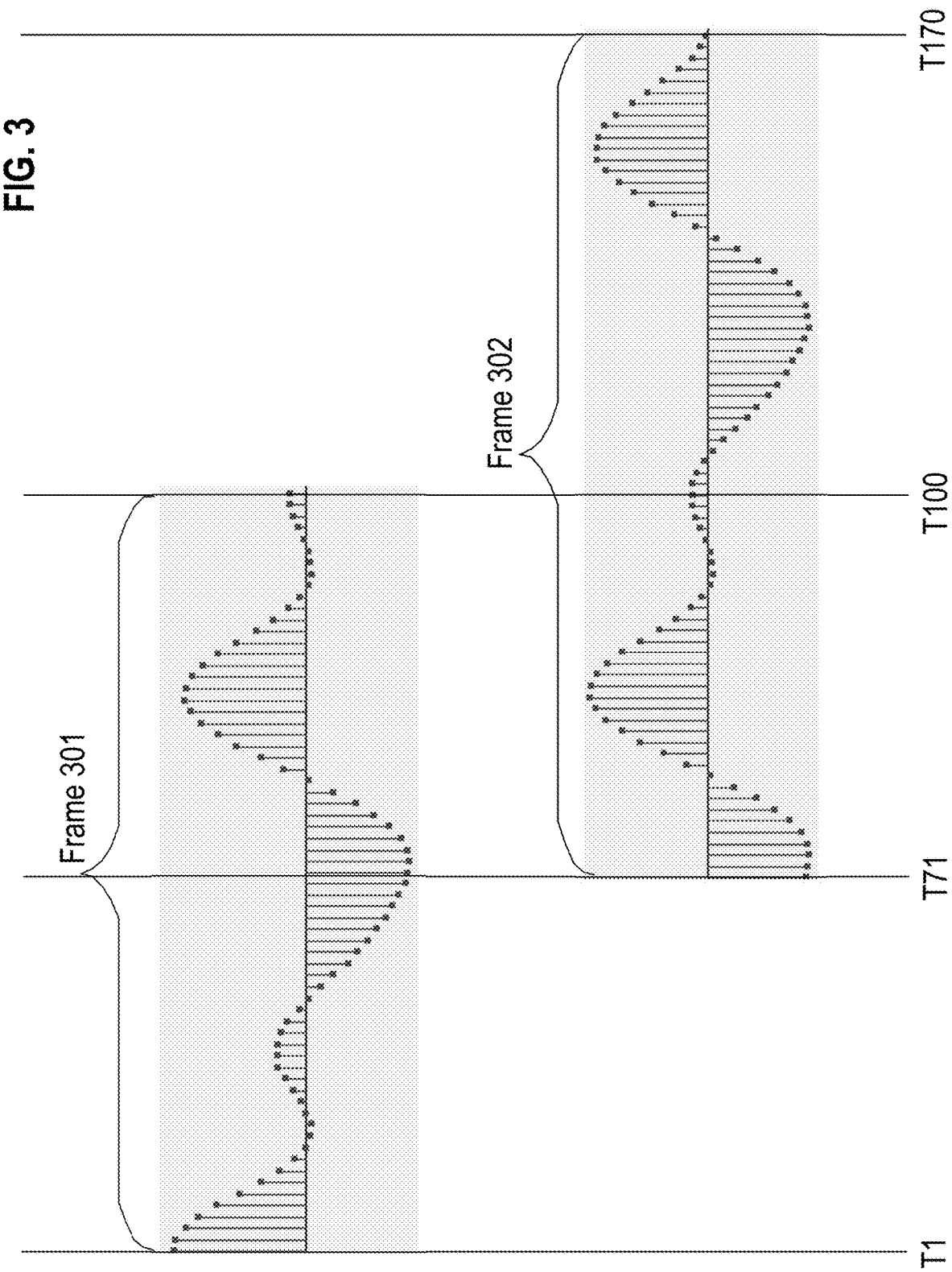

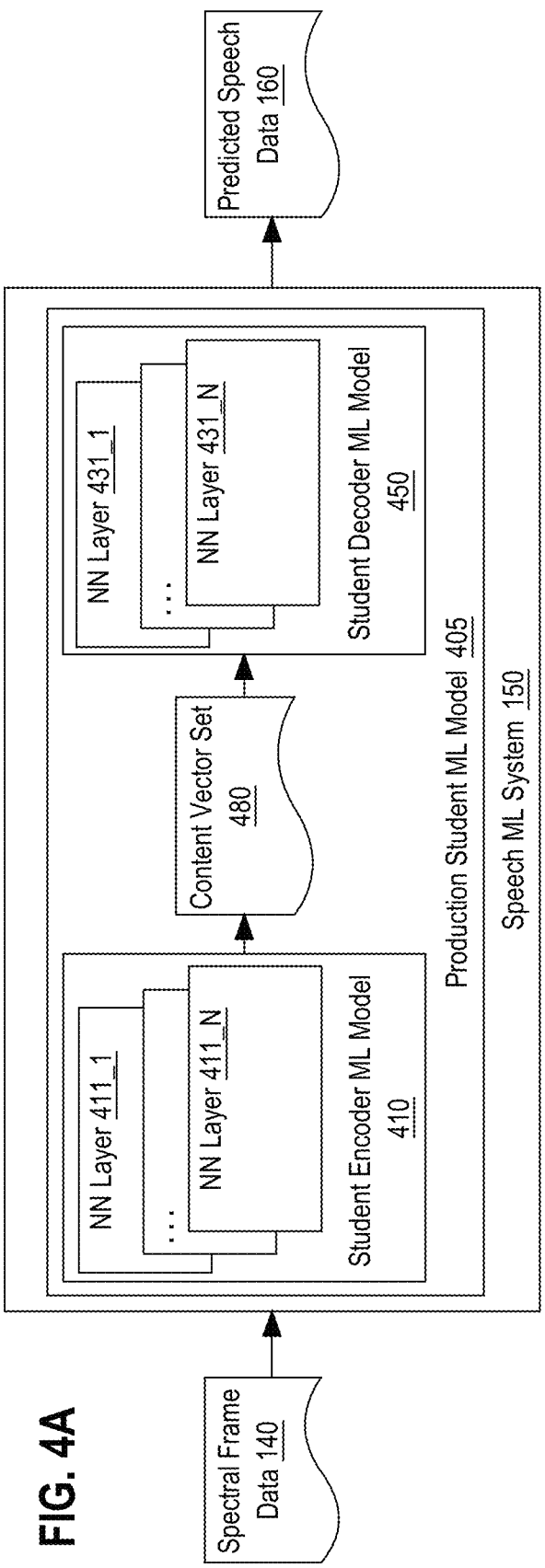
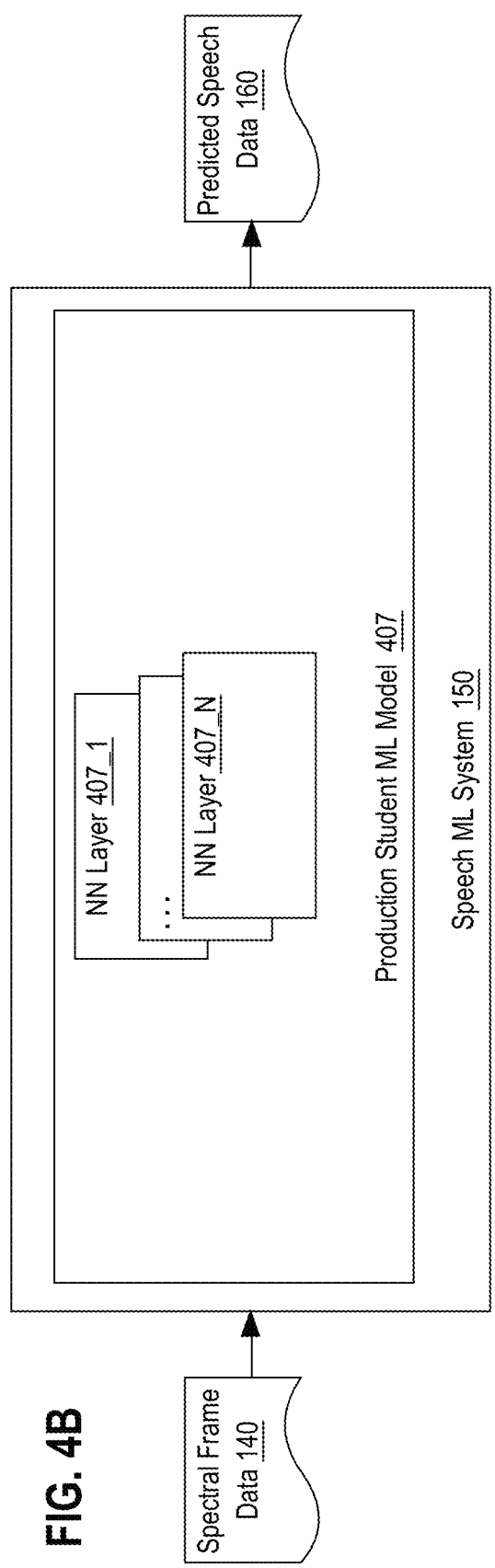

GENERATING PARALLEL DATA FOR REAL-TIME SPEECH FORM CONVERSION

BENEFIT CLAIM

This application claims the benefit under 35 U.S.C. § 119(e) of provisional application 63/528,251, filed Jul. 21, 2023, the entire content of which is hereby incorporated by reference for all purposes as if fully set forth herein. This application is related to an patent application, entitled "Pre-Trained Machine Learning Models For Real-Time Speech Form Conversion," filed concurrently, the entire contents of which are hereby incorporated by reference.

FIELD OF THE TECHNOLOGY

The present invention relates to the field of audio signal processing, in particular to real-time speech form conversion with machine learning techniques.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The challenge in speech conversion is not only to be able to convert speech audio from one form to another (e.g., accented speech to native speech) but also to do so in real-time. In particular, the quest for efficient, high-quality accent conversion has long been an area of interest within speech and audio processing. Accent conversion has significant potential for various applications, notably in real-time audio communication. The challenge is to design an audio processing algorithm that may transform a given input audio signal with L2 (original speech format, e.g., English with accent speech) into L1 (desired speech format, e.g., native English speech), maintaining the textual integrity and synchronicity, yet changing the accentual characteristics. Although the accent conversion for the English language is used as an example speech conversion task, the techniques described herein are equally applicable to other speech conversion tasks such as voice conversion, emotion conversion, bandwidth expansion, etc.

One approach to perform audio speech conversion may be to first convert the original audio stream to text and then convert the text data to the desired form of the audio speech stream. This approach may work for offline audio processing, but the real-time conversion would require extensive computing resources and will present an additional challenge of synchronization.

The synchronization challenge is particularly acute for real-time conversion. When the audio stream is converted to a non-temporal format such as text, the temporal information is lost, and thus, any conversion back to the audio format may not be synchronized.

Thus, avoiding intermediate format generation, such as text, to preserve the temporal aspects of the original audio stream is important to preserve the synchronization of the output audio stream with the input audio stream.

Even if an intermediate format is generated during the conversion, the synchronicity has to be preserved between the input, the intermediate format data and the output in the target format. This approach requires a large amount of synchronized speech data in the original, intermediate and target formats. Without large amounts of such data, it is impossible to train an accurate model for real-time recognition of phonemes. To address this challenge, it would be extremely hard, if not impossible, to collect such data from live recordings and much harder to synchronize such recordings.

BRIEF DESCRIPTION OF THE DRAWINGS

In the drawings of certain embodiments in which like reference numerals refer to corresponding parts throughout the figures:

FIG. 3 is a block diagram that depicts example frames as generated from input speech data, in an embodiment;

FIGS. 4A and 4B are block diagrams that depict Speech ML System 150 in production, in one or more embodiments;

DETAILED DESCRIPTION

Figure 1:
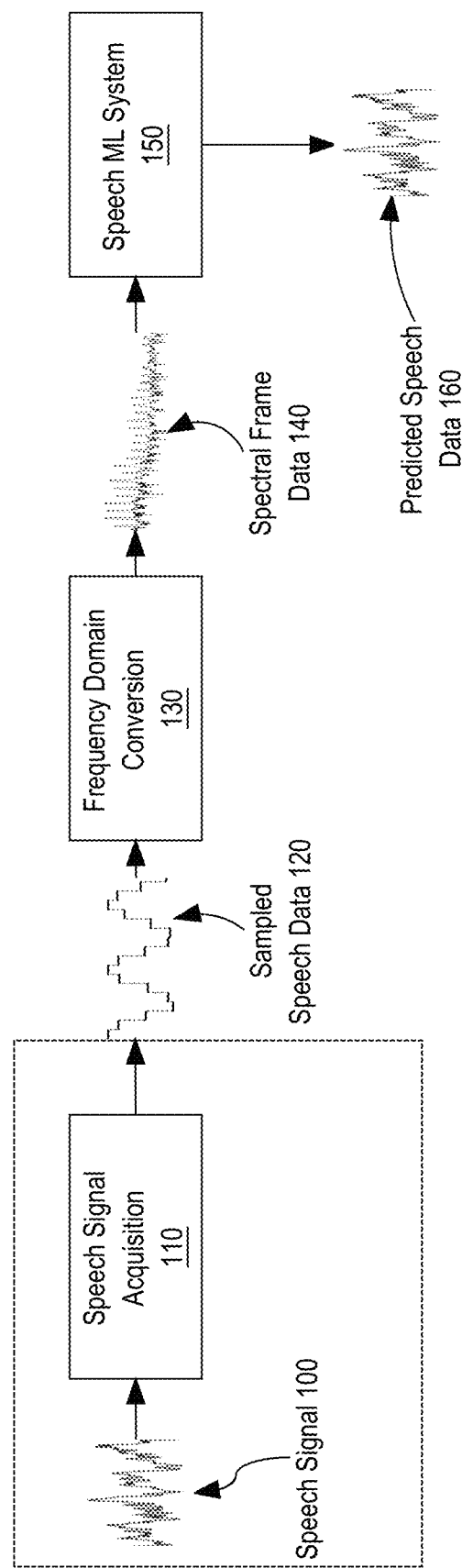
FIG. 1 is a block diagram that depicts a data flow for converting speech from an original form to a target form, in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques described herein generate synchronized multi-form speech data for training speech form conversion models and perform speech conversion from original form to target form in real-time. The real-time aspect refers herein to performing a conversion of form without having the full speech data but rather a portion thereof, thereby performing conversion while the original speech audio stream is being received/acquired and generating audio data in the target form of the speech without significant lag (e.g., 0.05 seconds to 0.3 seconds) as compared to the captured audio data in the original form.

In an embodiment, techniques include training a large-scale speech form conversion machine learning (ML) model, the Teacher Model on offline speech data. The Teacher ML Algorithm is trained with infinite lookahead of frame(s) of speech data, frames that may temporally be subsequent to the input frame of the speech data. Stated differently, the training for each input frame may be performed on complete speech data rather than on speech data received in real-time.

Thus, in an implementation for each frame of speech data, the Teacher Model is trained to generate the corresponding frame of speech data in the target form using not only the current frame (and/or the previous frame(s)) of speech data but also the temporally subsequent frame(s) of speech data (e.g., more than 5 seconds ahead) and up to the complete frame set of the speech data itself. Additionally, the Teacher Model may contain a greater number of layers and a larger dimension of layer(s) than the production model, referred to as the Student Model. Thus, the Teacher Model is more accurate but cannot process speech frames in real-time and, unlike the Student Model, may be too computationally resource-consuming to execute in production on an end-user computing device.

In one embodiment, the Teacher Model may include an encoder machine-learning model and a decoder machine-learning model. The term encoder ML model (or encoder) refers to a machine-learning model that converts speech to a speech-agnostic form of content-based data. A non-limiting example of content-based data includes text or phonetic posteriorgram (PPG) or opaque content representation data. Non-limiting examples of content representation data may include vectors derived from the output of layer(s) of an encoder ML.

The term decoder ML model (or decoder) refers to a machine-learning model that converts content-based speech data that is speech form agnostic to speech data in a target speech form that may be played back or readily converted to be played back. For example, the decoder may be trained to generate Waveform Audio File Format (WAV) data or spectral speech data that can be transformed into WAV data.

In one embodiment, the encoder ML model may be trained separately from the decoder. In such an embodiment, the encoder model may be trained using transcribed textual data or phoneme data set of the input speech data as the target value set for the encoder model. The target value set may be extracted using speech-to-text or speech-to-phoneme techniques.

During the training of an encoder, speech data in the original form is fed into the encoder ML algorithm to generate the predicted content data of the speech data. The predicted content data is compared with the actual content of the speech data to determine the loss function and to improve the accuracy of the encoder model by modifying the parameters of the encoder during the training.

Additionally or alternatively, target speech form speech data may be provided as input to the encoder ML algorithm during the training. Since the encoder ML algorithm converts any form of speech data to form-independent encoded speech data, the trained encoder ML model may accurately convert both original and target forms of speech data into content-based data, thereby generating content-based vector sets.

The Teacher Model's decoder is trained by providing as input to the decoder ML algorithm the content-based data generated by the already trained encoder ML model. The content-based data itself may be generated by providing speech data in its target form to the encoder ML as input. The same speech data of the target form is the target speech data, which is to be compared with the predicted speech data generated by the decoder ML algorithm to determine the loss function.

Thus, in such an embodiment, the training of the Teacher Model may be performed without parallel speech data. The term "parallel speech data" (or "parallel data") refers herein to streams of speech data of the same content but different speech forms and having time synchronicity. Each frame of one speech form stream of parallel data has time correspondence to the corresponding frame in the other speech form stream of the parallel data of the same content.

To avoid the use of parallel data, the training of the encoder ML algorithm of the Teacher Model takes as input either the target or original form speech data to train the encoder to generate speech-form agnostic content-based data as the target output. Thereby, the training of the encoder algorithm requires only correspondence of speech data of any form with its content. And the decoder ML algorithm may be trained only using target-form speech data. Accordingly, the techniques for training the Teacher Model may use target-form or original-form speech data independently of one another.

Because of the availability of both the target-form and original-form speech data in vast amounts, the training of the teacher model may be performed with large amounts of such data without the need for the target and original-form speech data to be synchronous (parallel data).

The Teacher Model's Encoder, having a large size (e.g., greater number of layers and/or dimensions of the layers than the Student Model), generates accurate speech-agnostic data for any form of speech data. For the same reason, the Teacher Model Decoder Model, also having a greater number of parameters, once trained, is very accurate.

Therefore, in an embodiment, the trained Teacher Model generates sets of accurate parallel data. Original-form speech data is provided as input to the Teacher Model, and the Teacher Model generates the corresponding temporally synched target-form speech data. The generated parallel data is of the same content and is time-synched between the original form and the target form. Accordingly, the Teacher Model may generate an unlimited amount of parallel data, given the availability of speech data in the original form.

In an embodiment, the generated parallel data is used to train a lightweight and real-time Student Model. The ML algorithm of the Student Model may differ from the ML algorithm of the Teacher Model by having a lesser number and/or smaller size of layers, a lower order of execution, and a lesser number of parameters and features. Accordingly, having less of one or more of the mentioned entities in the ML algorithm of the Student Model makes the trained Student Model much faster to process speech data and generate the corresponding target-form speech data with lesser lag.

Moreover, the Student Model is a real-time processing ML algorithm. The Student ML algorithm uses frames of speech data that are temporally prior to the input frame of the speech data for training. Consequently, the Student Model, unlike the Teacher Model, is a real-time model that contemporaneously processes input speech data stream, each input frame processing relying on the frames that are temporally within the allowable lag for the real-time processing.

Additionally or alternatively, the Student Model may depend on the Teacher Model during the training. In an embodiment, one or more properties may be extracted from the trained larger ML model, such as the Teacher Model, and used for the training of the Student Algorithm. For example, one or more of the layers in the Teacher Model retains at least a portion of the information on how to accurately convert the original speech form data into the target speech form data. In such an embodiment, the Student Model is generated to be based at least in part on one or more layers of the Teacher Model. For example, during the training of the Student Model, additional constraints are imposed on one or more layers of the Student Model to track (have the acceptable threshold of difference) with the one or more layers of the Teacher Model. Stated differently, the loss function for the training of the Student Model includes the similarity of layers (e.g., the vectors thereof) with the same corresponding layer in the trained Teacher Model. Thus, a layer (and the parameters thereof) in the Student Model may be trained to be within the acceptable error margin of the corresponding layer (and the parameters thereof) in the Teacher Model.

Data Flow Overview

FIG. 1 is a block diagram that depicts a data flow for converting speech from an original form to a target form, in an embodiment. At Speech Signal Acquisition block 110, Speech Signal 100 is acquired in real-time by sampling the signal at a predetermined sampling frequency. For example, a non-native speech may be acquired as Speech Signal 100 by a microphone of a recording device, and, in response, Speech ML System 150 generates speech with the same content in the target form. Additionally, Speech Signal 100 may be in the target form for one or more embodiments of training ML algorithms of Speech ML System 150.

In an embodiment, Speech Signal Acquisition block 110 acquires and samples a portion of Speech Signal 100 to produce Sampled Speech Data 120. The duration portion may be pre-configured to be at least the minimum duration that is necessary to acquire enough speech samples for capturing the frequency spectrum of a speech audio signal. A non-limiting example may be a portion of 256 samples of Speech Signal 100 acquired at the 44.1 KHz sampling/frequency, yielding 0.0058 seconds for each portion duration. Each generated portion of Speech Signal Acquisition block 110 may contain a sequence of amplitude values for the acquired Speech Signal 100 as part of Sampled Speech Data 120.

Alternatively, Sampled Speech Data 120 may be obtained from a pre-acquired and stored audio file. A non-limiting example may be a WAV file that contains Sampled Speech Data 120 in the original form (e.g., non-native accented speech) or the target form (e.g., native speech).

At Frequency Domain Conversion block 130, the process performs frequency domain transformation of Sampled Speech Data 120, thereby generating Spectral Frame Data 140. The transformation converts the sequence of sampled audio data of a frame in the time domain to frequency component values in the frequency domain, yielding Spectral Frame Data 140. Frequency Domain Conversion block 130 may use a Short-Time Fourier Transform (STFT) algorithm to generate a time-frequency transformation of non-stationary signals. However, the exact frequency conversion methodology is not material to the techniques described herein.

Figure 2:
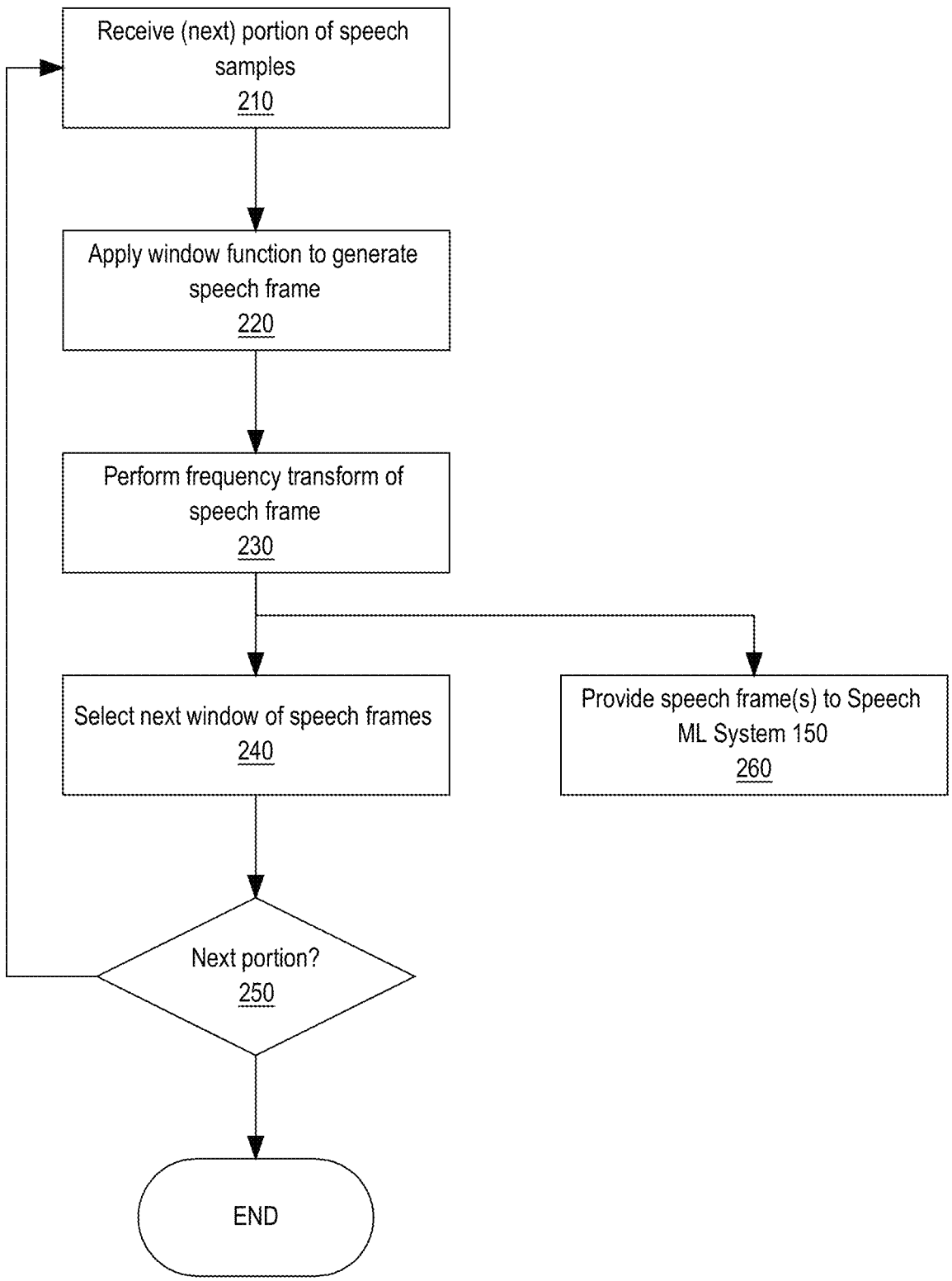
FIG. 2 is a block diagram that depicts a process for transforming sampled speech audio data into frames of spectral data, in an embodiment.

FIG. 2 is a block diagram that depicts a process for transforming sampled speech audio data into frames of spectral data, in an embodiment. At step 210, the process obtains a portion of speech audio samples. Sampled Speech Data 120 may be an audio stream, portions of which are processed sequentially by the process.

At step 220, the process applies a window function (e.g., a Hanning, Hamming, Vorbis, Gaussian, or other windowing techniques) of finite length. The length of the window is also called the frame length. In an embodiment, the frame length is fixed to the same length for speech data being processed by the ML models of Speech ML System 150 (e.g., 20 ms to 80 ms audio portion).

FIG. 3 is a block diagram that depicts example frames as generated from input speech data, in an embodiment. Frame 301 is a sample frame that contains one hundred speech data samples from Sample T1 to Sample T100. Each sample frame includes an amplitude value or the window function application result on the amplitude value of the Speech Signal 100.

For example, the window function may be a discrete function (e.g., a vector) of a given amount of samples. The window function is applied by taking a portion of the audio stream with the number of samples equal to the frame length. Each of these samples is then multiplied by the corresponding value of the window function, resulting in a windowed frame.

At step 230, the process converts the speech audio signal from the time domain to the speech audio signal to its spectral data in the frequency domain. For example, the process may perform the Discrete Fourier Transform (DFT) on the windowed frame.

Additional steps may be performed, such as calculating the magnitudes or squares of magnitudes of Fourier coefficients, applying band compression techniques, and/or transforming the scale of the frequency coefficients (calculating the logarithms of the output). As a result, the process generates temporally arranged spectral features of the audio stream. Non-limiting examples of such features are log power spectrum (LPS), mel spectrogram, mel frequency cepstral coefficients (MFCC), etc.

At step 260, the temporally arranged sequence of frames of generated spectral features may be provided to Speech ML System 150 for generating the corresponding frame of the output speech signal in the target form. Additionally or alternatively, the frame of spectral feature speech data may be provided for training one or more ML algorithms to generate the corresponding ML models of Speech ML System 150.

At step 240, the process selects the next frame in the received portion(s) of the speech samples. The frames may overlap depending on the starting point selected for the next frame. The amount (number of audio samples) by which the window for framing is moved. The amount of audio samples moved for the next windowing of a frame is referred to as the hop size or hop length. Accordingly, when the hop size is less than the frame length then windowed frames may overlap.

Continuing with FIG. 3 example, the next frame, Frame 302, is selected using a hop size of 70 samples. Thus, Samples T71 through T100 overlap in Frame 301 and Frame 302. When selecting, at step 240, the next frame includes a portion that has not yet been received by the process; at step 250, the process may proceed to step 210 to select the next portion.

In an embodiment, when all portions of speech data are received by the process and the above-mentioned techniques performed on the speech data, the process, at step 260, provides a 2D time-frequency representation of the signal where one axis represents time when arranged in time sequence of the corresponding frames (derived from the window positions), and the other represents frequency magnitude.

Production Speech Machine Learning System

FIGS. 4A and 4B are block diagrams that depict Speech ML System 150, in one or more embodiments. Speech ML System 150, when in production, includes one or more already trained models, collectively referenced as Production Student Model 405/407. Speech ML System 150 may process each frame of Spectral Frame Data 140 in real-time as the speech is acquired by Speech Signal Acquisition block 110 and transformed to corresponding one or more frames of Speech Spectral Frame Data 140. Production Student Model 405/407 may have access to temporally previous frames of the received frame but very few, if not none of the frames that are temporally subsequent to the received frame. At most, Production Student Model 405 may have access to as many frames subsequent to the current frame being processed that will not cause a significant delay/lag in generating the corresponding frame of Predicted Speech Data 160 in the target speech form. For example, the number of subsequent frames should not exceed the accepted lag for real-time processing of Production Speech ML System 150 (e.g., 0.05 seconds to 0.3 seconds duration).

In FIG. 4A, Production Student Model 405 includes Student Encoder Model 410 and Student Decoder Model 450, in an embodiment. In such an embodiment, Student Encoder Model 410 is a neural network ML model having Neural Network (NN) Layers 411_1 through 411_N. NN Layers 4111 through 411_N are trained (configured) to process each frame of Spectral Frame Data 140 to yield the corresponding frame of content-based data such as Content Vector Set 480.

Student Decoder Model 450 takes as input a content-based vector and produces back a new frame of speech corresponding to the original frame but in a target speech form that is different from the original speech form of Spectral Frame Data 140. NN Layers 431_1 through 431_N may be trained (configured) to reproduce the content-based vector in different speech forms. Non-limiting examples of target speech forms of Predicted Speech Data 160 are a native form of speech and/or noiseless form of speech from an accented form of speech and/or noisy form of speech of Spectral Frame Data 140, respectively. Predicted Speech Data 160 may be reproduced by an audio device.

FIG. 4B is another embodiment of Speech ML System 150, having Production Student Model 407. In this embodiment, Production Student Model 407 has a single ML model having NN Layers 407_1 through 407_N. The difference between a single ML real-time student model and multiple ML real-time student models is that in the multiple ML models, the models may be trained separately and may be more accurate for the specific task of each model. While in the single ML model, all the layers are trained together.

Since Production Student Model 405/407 is executed in a constraint computing resource environment (e.g., on-site server, a personal computer, or a smartphone), Production Student Model 405/407 has to be as compact as possible yet accurate and fast in processing (minimal lag between the frame acquired and the frame produced.

Teacher Training

In an embodiment, to make Production Student Model 405/407 accurate, yet without adding a significant processing lag, one or more Teacher Models are trained, and the training knowledge may be "transferred" to the Production Student Model 405/407. Since the Teacher Model is trained offline, no computing resource constraint exists. Thus, the Teacher Model may have more NN layers, and each layer may have much larger dimensions (have more parameters) than the Production Student Model 405/407. For example, the Teacher Model may have more than 100 million parameters.

Additionally, the Teacher Model is trained with infinite lookahead of speech data that is not available to the real-time Student Model. For example, the Student Model, being executed in real-time with the acquisition of the speech signal, cannot take into account the speech frames that are temporally significantly ahead of the current frame because such processing introduces at least as much lag as the number of future frames. On the other hand, the Teacher Model, being executed offline, can use pre-recorded speech data and may look ahead as much as necessary, if not completely, till the end of the speech data itself.

Another advantage of using the Teacher Model is the production of parallel data of original form speech and target form speech by the trained Teacher Model. Teacher Model having more layers with more parameters and trained with higher quality data may produce a very accurate transformation of the speech form. More importantly, the transformation produced is in complete temporal synch with the original form of the speech. Such generated parallel data may be used in the training of Production Student Model 405/407 to make it more accurate.

In an embodiment, the Teacher Model processes temporally sequential frames, e.g., spectral features of input speech, and includes recurrent neural network block(s). The Teacher Model transforms the input and finds patterns in the data structure, not just along the frequency dimension but also temporally, among the frames because of the Teacher Model's ability to look ahead into the subsequent frame(s) and look back into the previous frame(s).

In an embodiment, the Teacher Model may include various neural network block(s) such as Gated Recurrent Units (GRUs) and Long Short-Term Memory (LSTM) block(s). Multihead attention-based block(s), such as a conformer block, may also be used. For the Teacher model to generate the output for the current input audio frame, the information from the previous and future frames may be used (bidirectional processing).

Teacher Encoder Training

In an embodiment, Teacher ML Algorithm of Speech ML System 150 includes Teacher ML Encoder Algorithm and Teacher ML Decoder Algorithm to be trained separately to generate corresponding Teacher ML Encoder Model and Teacher ML Decoder Model.

In an embodiment, the Teacher Encoder Algorithm is trained to generate content-based data that contains information on the content of the input audio signal. The training dataset for this model comprises a large collection of original and target forms of speech data. For example, a large number of accented and native US English speech audio samples, along with their corresponding textual content transcriptions.

Figure 5:
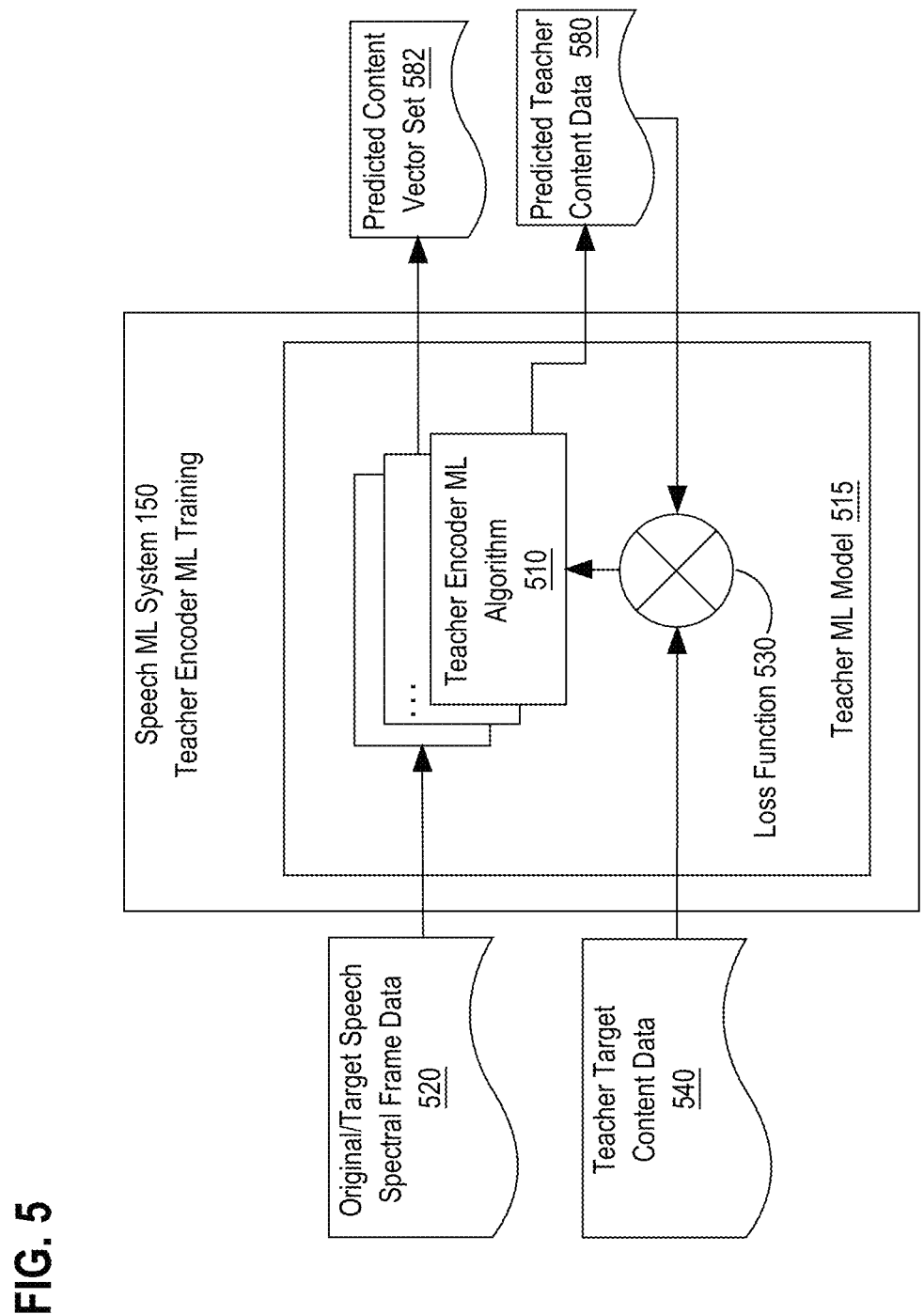
FIG. 5 is a block diagram that depicts a process of training a Teacher Encoder Algorithm, in an embodiment.

FIG. 5 is a block diagram that depicts a process of training a Teacher Encoder Algorithm, in an embodiment. Speech ML System 150 may be configured to train Teacher Encoder ML Algorithm 510. Teacher Encoder ML Algorithm 510 may be trained to extract the content of speech data from both the original speech form and the target speech form, or both, whichever is used as input to the training.

For example, when applying a US phoneme/text prediction task to the encoder network of Teacher Encoder ML Algorithm 510, the model of Teacher Encoder ML Algorithm 510 implicitly learns to encode the phonetic structure of US native speech. Similarly, when provided with the accented form, the encoder model learns how to recognize and encode the phonetic structure of the accented speech.

In an embodiment, the training is performed by providing to Teacher Encoder ML Algorithm 510 with Original or Target Speech Spectral Frame Data 520 and the corresponding transcription content data as the training data set. During the training, Teacher Encoder ML Algorithm 510 generates Predicted Teacher Content-based Data 580. For example, Teacher Encoder ML Algorithm 510 is trained with speech-to-text or phoneme recognition tasks or even self-supervised learning on audio speech data or any other audio pattern recognition task.

In the training, each frame of Predicted Teacher Content-based Data 580 is compared with the corresponding frame portion of Teacher Target Content Data through the application of Loss Function 530. A non-limiting example of a loss function is a Connectionist Temporal Classification (CTC) loss calculation, which accurately calculates probabilities of a match even in a temporally misaligned comparison of predicted and target data.

Using the same techniques, Teacher Encoder ML Algorithm 510 is trained to detect content (e.g., text or PPG) even when the input is noisy, in an embodiment. Original or Target Speech Spectral Frame Data 520 is augmented with noise and provided to the Teacher Encoder ML Algorithm to generate the content of Spectral Frame Data 520. Thus, when the Teacher Encoder ML Algorithm is trained, the ML model thereof may generate accurate content even if the input is noisy speech data.

Once the ML model of Teacher Encoder ML Algorithm 510 is generated by the training, the process selects at least one of the hidden layers of the ML model (e.g., the last hidden layer) as the layer for generating Predicted Content Vector Set 582. The encoder ML model returns audio frame-level Predicted Content Vector Set 582 for encoded content information based on the output vector(s) of the selected layer(s) for each input frame. The generated speech based on Predicted Content Vector Set 582 closely approximates the target form of speech, such as the US native speech form, exhibiting significantly fewer phonetic errors compared to the input accented speech.

Teacher Decoder Training

A Teacher ML Decoder Model may convert the content-based data frames generated by the Teacher ML Encoder Model back into speech data but in the target speech form. In an embodiment, the Teacher ML Decoder Algorithm is trained to receive as an input a sequence set of content-based vectors and generate speech data in the target form.

Figure 6:
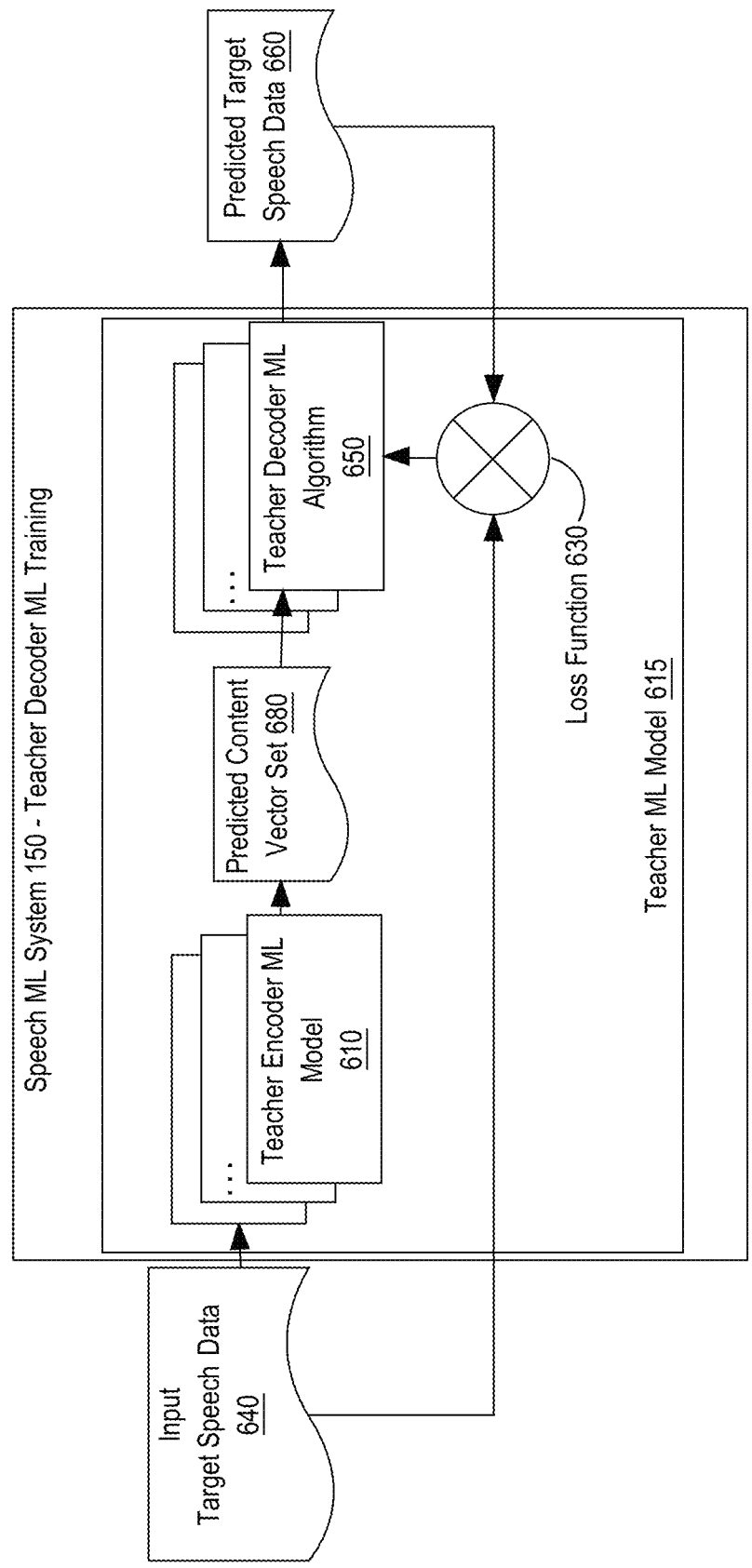
FIG. 6 is a block diagram that depicts the process of training a Teacher Decoder ML Algorithm of Speech ML System 150, in an embodiment.

FIG. 6 is a block diagram that depicts the process of training a Teacher Decoder ML Algorithm of Speech ML System 150, in an embodiment. To generate a training data set for training Teacher ML Decoder Algorithm 650, previously trained Teacher Encoder ML Model 610 is provided with Input Target Speech Data 640. Based on the provided Input Target Speech Data 640, Teacher Encoder ML Model 610 generates form-agnostic content-based data describing the content of Input Target Speech Data, Predicted Content-based Vector Set 680.

Based on providing Predicted Content-based Vector Set 680 as input in the training, Teacher Decoder ML Algorithm 650 learns to generate back the original input speech data in the same target form as Input Target Speech Data 640. Thereby, Predicted Target Speech Data 660 is generated by Teacher Decoder ML Algorithm 650. Accordingly, Teacher Decoder ML Algorithm 650 attempts to generate the speech data in the target form with the same content as the input to Teacher Encoder ML Model 610.

Comparing Predicted Target Speech Data 660 with Input Target Speech Data 640 by Loss Function 630 may yield an error for the training of Teacher Decoder ML Algorithm 650. The output of Loss Function 630 is used to adjust the parameters of Teacher Decoder ML Algorithm 650 to generate more accurate predicted speech data in the next round until the error is within an acceptable margin.

Because Teacher Decoder ML Algorithm 650 is trained to generate speech data in the target speech form, Input Target Speech Data 640 is also provided in the target form. Each frame of Input Target Speech Data 640 in the target form generates form-agnostic frame data for Predicted Content Vector Set 680. In an embodiment, Input Target Speech Data 640 before being provided to Teacher Model 615 may be converted to spectral frame data (not depicted in FIG. 6). Nevertheless, the frame data of Predicted Target Speech Data 660 generated by Teacher Decoder ML Algorithm 650 during the training is compared for Loss Function 630 such as combination of Least Square Error or Least Absolute Error for predicted and target speech data spectral features and Generative Adversarial Network (GAN) training losses. And Teacher Decoder ML Algorithm 650 is adjusted accordingly.

Generating Parallel Data

When the Teacher ML Algorithm is trained using large data sets, the generated Teacher ML Model is highly accurate in converting the input original form of speech data to the corresponding output target form of speech data. Accordingly, the original form of input Spectral Speech Data may be provided as an input sequence of frames of spectral data in the original speech form (which itself was generated from the corresponding sequence of frames of speech data in the original form) to generate the corresponding sequence of frames of speech data in the target form, in an embodiment. Thereby, because of the frame correspondence between input and output, the Teacher ML Model generates temporally synched parallel data that may include one or more input speech data, input speech spectral data, a form-agnostic content-based vector set, and output speech data.

For example, accented (and/or noisy) speech is processed by the Teacher Encoder ML Model on a frame-by-frame basis, which generates the corresponding sequence set of content-based vectors that are speech form agnostic. The generated sequence set of content-based vectors is temporally synched with input speech in the original form (both in the spectral as well as the original representation) and, thus, may be used as parallel data for the Student Model training.

Additionally, in such an example, the Teacher Decoder ML Model takes the sequence set of content-based vectors as input and generates the corresponding frames of US native speech data. Since the processing of speech audio again occurs on the frame-by-frame level, the input and generated speech waveforms are time-synchronized, ensuring temporal alignment. By combining the input and generated output speech waveforms, parallel data of input (spectral) speech data in the original and output speech data in the target form is obtained.

In another embodiment, Teacher ML Model 615 may include a vocoder ML model in addition to a decoder ML Model. In such an embodiment, the decoder ML model is trained to generate frame-level spectral speech data of the target form. The additional ML model, the vocoder ML model, is trained to generate speech-framed data in the target form from the spectral-framed data obtained from the decoder, thereby reconstructing the final waveform of the target speech signal. Since the additional model still produces speech data that is framed synched with the inputs to the Teacher Encoder ML Model and the Teacher Decoder ML Model, the Teacher ML Model of this embodiment may still produce similar parallel data for Student ML Algorithm training.

Alternatively, parallel data may be used to train a Teacher Model. In such an embodiment, the Teacher ML Algorithm may also have a single neural network architecture, a single ML model, which takes as input the spectral feature sequence of the original form speech (e.g., accented speech) and generates an approximate target form speech signal (e.g., accent-converted speech signal). In such an embodiment, to train the single model parallel speech data is requested as input for training. The parallel speech data includes frame-level aligned speech data in the original form and in the target form (e.g., accented and US-native English speech audio signals). Such an alignment may be achieved, for example, using a dynamic time warping (DTW) algorithm applied on the accented and target speech signal feature sequences, other methods for parallel data generation also may be applied.

Training Student ML Algorithm

The large-scale trained Teacher ML Model serves as a resource for more accurate and faster training of the Student ML Algorithm. In an embodiment, the Teacher ML Model may generate parallel data as described above as a comprehensive temporally synched training data set for the Student ML Algorithm.

Additionally or alternatively, the same or different Teacher ML Model may provide the trained NN layers to the Student ML Algorithm during training. The Student ML Algorithm may use the NN layer parameters of the Teacher ML Model to compare with the corresponding parameters of its NN layer(s).

In an embodiment, the comparison may be performed as part of the loss function for the training of the Student ML Algorithm to ensure that the corresponding layers (and the parameters thereof) of the Student ML Algorithm track the same layers (and the parameters thereof) of the Teacher ML Model. In such an embodiment, the Teacher ML Algorithm may use the same dimension NN Layers as the Student ML Algorithm. If the dimensions sizes are different, a layer size scaling function may be applied to the vector of NN Layer parameters of the Teacher ML Model to match that of the Student ML Algorithm.

Figure 7:
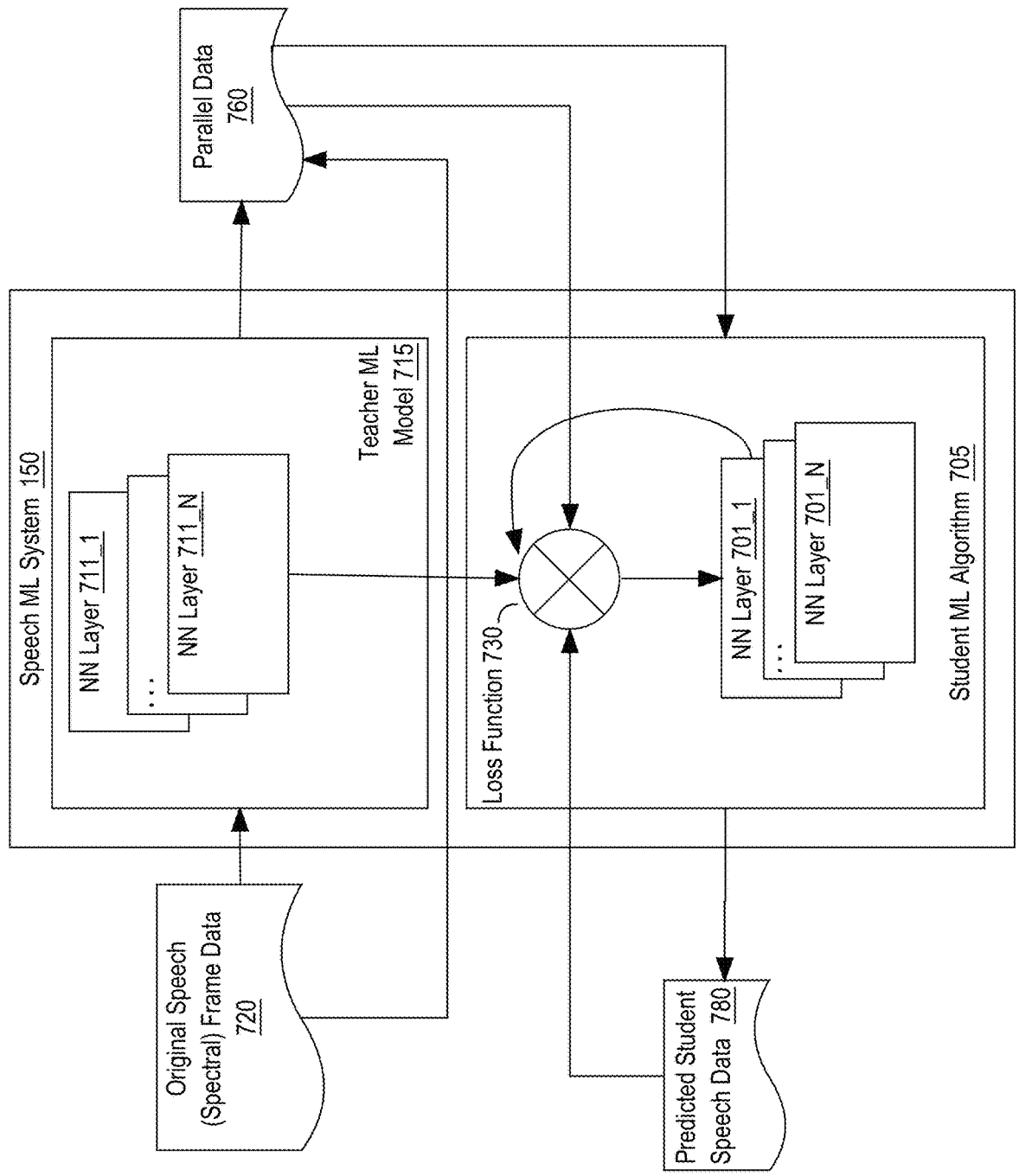
FIG. 7 is a block diagram that depicts a process of training the Student ML Algorithm using the Teacher ML Model, in one or more embodiments.

FIG. 7 is a block diagram that depicts a process of training the Student ML Algorithm using the Teacher ML Model, in one or more embodiments. As discussed above, once the Teacher ML Algorithm is trained, Teacher ML Model 715 may generate parallel data for training Student ML Algorithm 705. The Encoder Model of Teacher ML Model 715 may generate Parallel Data 760 (frame-by-frame synchronized) of input Original (Spectral) Speech Data 720 in the original speech form and the corresponding sequence of content-based (form-agnostic) vector set (part of Parallel Data 760). Such Parallel Data 760 may be used to train Student Teacher ML Encoder Algorithm 705 with Loss Function 730 applied on comparison of the predicted sequence of content-based vectors with the corresponding sequence of content-based vectors from Parallel Data 760.

Parallel Data 760 may include a training set of Original Speech Data in the original form (e.g., accented and/or noisy) and the corresponding frame-by-frame sequence of a content-based vector set.

Additionally or alternatively, parameter(s) of one or more layers of NN Layers 7111 to 711_N from the Encoder Model of Teacher ML Model 715 may be compared with corresponding parameters of NN Layers 701_1 to 701_N of the Encoder Algorithm of Student ML Algorithm 705 as part of applying Loss Function 730. Therefore, training the Encoder Model of Student ML Algorithm 705 ensures that the parameters for these layer(s) closely track (within the margin of error set for Loss Function 730) the values for the corresponding parameters of the corresponding layers the Encoder Model of Teacher ML Model 715.

Similar techniques may be used for the training of the Decoder Algorithm of Student ML Algorithm 705. The Decoder Model of Teacher ML Model 715 may generate Parallel Data 760 (frame-by-frame synchronized) of input Original (Spectral) Speech Data 720 and the corresponding output (spectral) speech data (part of Parallel Data 760). Such Parallel Data 760 may be used to train the Decoder Algorithm of Student Teacher ML Decoder Algorithm 705 with Loss Function 730 applied on comparison of the predicted sequence of output (spectral) speech data with the corresponding sequence of Parallel Data 760.

Additionally or alternatively, parameter(s) of one or more layers of NN Layers 7111 to 711_N from the Decoder Model of Teacher ML Model 715 may be compared with corresponding parameters of NN Layers 701_1 to 701_N of the Decoder Algorithm of Student ML Algorithm 705 as part of applying Loss Function 730. Accordingly, the training of the Decoder Algorithm of Student ML Algorithm 705 ensures that the parameters for these layer(s) closely track (within the margin of error set for Loss Function 730) the values for the corresponding parameters of the corresponding layers of the Decoder Model of the Teacher ML Model 715.

Further Details on Training Machine Learning Model

Machine learning techniques include applying a machine learning algorithm on a training data set, for which outcome (s) are known, with initialized parameters whose values are modified in each training iteration to more accurately yield the known outcome(s) (referred herein as "label(s)"). Based on such application(s), the techniques generate a machine-learning model with known parameters. Thus, a machine learning model includes a model data representation or model artifact. A model artifact comprises parameter values, which are applied by a machine learning algorithm to the input to generate a predicted output. Training a machine learning model entails determining the parameter values of the model artifact. The structure and organization of the parameter values depend on the machine learning algorithm.

Accordingly, the term "machine learning algorithm" (or simply "algorithm") refers herein to a process or set of rules to be followed in calculations in which a model artifact, comprising one or more parameters for the calculations, is unknown. The term "machine learning model" (or simply "model") refers herein to the process or set of rules to be followed in the calculations in which the model artifact, comprising one or more parameters, is known and has been derived based on the training of the respective machine learning algorithm using one or more training data sets. Once trained, the input is applied to the machine learning model to make a prediction, which may also be referred to herein as a predicted outcome or output.

In supervised training, training data is used by a supervised training algorithm to train a machine learning model. The training data includes input and "known" output, label. In an implementation, the supervised training algorithm is an iterative procedure. In each iteration, the machine learning algorithm applies the model artifact and the input to generate a predicted output. An error or variance between the predicted output and the known output is calculated using an objective function, loss function. In effect, the output of the loss function indicates the accuracy of the machine learning model based on the particular state of the model artifact in the iteration. By applying an optimization algorithm based on the loss function, the parameter values of the model artifact are adjusted. The iterations may be repeated until the desired accuracy is achieved or some other criteria are met.

In an implementation, to iteratively train an algorithm to generate a trained model, a training data set may be arranged such that each row of the data set is input to a machine learning algorithm and further stores the corresponding actual outcome, label value, for the row. For example, each row of the adult income data set represents a particular adult for whom the outcome is known, such as whether the adult has a gross income over $500,000. Each column of the adult training dataset contains numerical representations of a particular adult characteristic (e.g., whether an adult has a college degree or the age of an adult) based on which the algorithm, when trained, can accurately predict whether any adult (even one who has not been described by the training data set) has a gross income over $500,000.

The row values of a training data set may be provided as inputs to a machine learning algorithm and may be modified based on one or more parameters of the algorithm to yield a predicted outcome. The predicted outcome for a row is compared with the label value, and based on the difference, an error value is calculated. One or more error values for the batch of rows are used in a statistical aggregate function to calculate an error value for the batch. The "loss" term refers to an error value for a batch of rows.

At each training iteration, based on one or more predicted values, the corresponding loss values for the iteration are calculated. For the next training iteration, one or more parameters are modified to reduce the loss based on the current loss. Any number of iterations on a training data set may be performed to reduce the loss. The training iterations using a training data set may be stopped when the change in the losses between the iterations is within a threshold. In other words, the iterations are stopped when the loss for different iterations is substantially the same.

After the training iterations, the generated machine learning model includes the machine learning algorithm with the model artifact that yielded the smallest loss.

For example, the above-mentioned adult income data set may be iterated using the Support Vector Machines (SVM) algorithm to train an SVM-based model for the adult income data set. Each row of the adult data set is provided as an input to the SVM algorithm, and the result, the predicted outcome, of the SVM algorithm is compared to the actual outcome for the row to determine the loss. Based on the loss, the parameters of the SMV are modified. The next row is provided to the SVM algorithm with the modified parameters to yield the next row's predicted outcome. The process may be repeated until the difference in loss values of the previous iteration and the current iteration is below a pre-defined threshold or, in some implementations, until the difference between the smallest loss value achieved and the current iteration's loss is below a pre-defined threshold.

Once the machine learning model for the machine learning algorithm is determined, a new data set for which an outcome is unknown may be used as input to the model to calculate the predicted outcome(s) for the new data set.

In a software implementation, when a machine learning model is referred to as receiving an input, executing, and/or generating output or prediction, a computer system process executing a machine learning algorithm applies the model artifact against the input to generate predicted output. A computer system process executes a machine learning algorithm by executing software configured to cause the execution of the algorithm.

Further Details on Machine Learning Algorithms and Domains

A machine learning algorithm may be selected based on the domain of the problem and the intended type of outcome required by the problem. The non-limiting examples of algorithm outcome types may be discrete values for problems in the classification domain, continuous values for problems in the regression domain, or anomaly detection problems in the clustering domain.

However, even for a particular domain, there are many algorithms to choose from for selecting the most accurate algorithm to solve a given problem. As non-limiting examples, in a classification domain, Support Vector Machines (SVM), Random Forests (RF), Decision Trees (DT), Bayesian networks (BN), stochastic algorithms such as genetic algorithms (GA), or connectionist topologies such as artificial neural networks (ANN) may be used.

Implementations of machine learning may rely on matrices, symbolic models, and hierarchical and/or associative data structures. Parameterized (i.e., configurable) implementations of best-of-breed machine learning algorithms may be found in open-source libraries such as Google's TensorFlow for Python and C++ or Georgia Institute of Technology's MLPack for C++. Shogun is an open-source C++ ML library with adapters for several programming languages, including C #, Ruby, Lua, Java, MatLab, R, and Python.

Hyper-Parameters, Cross-Validation and Algorithm Selection

A type of machine algorithm may have unlimited variants based on one or more hyper-parameters. The term "hyper-parameter" refers to a parameter in a model artifact that is set before the training of the machine algorithm model and is not modified during the training of the model. In other words, a hyper-parameter is a constant value that affects (or controls) the generated trained model independent of the training data set. A machine learning model with a model artifact that has only hyper-parameter values set is referred to herein as a "variant of a machine learning algorithm" or simply "variant." Accordingly, different hyperparameter values for the same type of machine learning algorithm may yield significantly different loss values on the same training data set during the training of a model.

For example, the SVM machine learning algorithm includes two hyperparameters: "C" and "gamma." The "C" hyper-parameter may be set to any value from $10^{-3}$ to $10^5$, while the "gamma" hyper-parameter may be set from $10^{-5}$ to $10^3$. Accordingly, there are endless permutations of the "C" and "gamma" parameters that may yield different loss values for training the same adult income training data set.

Therefore, to select a type of algorithm or, moreover, to select the best-performing variant of an algorithm, various hyper-parameter selection techniques are used to generate distinct sets of hyper-parameter values. Non-limiting examples of hyper-parameter value selection techniques include a Bayesian optimization such as a Gaussian process for hyper-parameter value selection, a random search, a gradient-based search, a grid search, hand-tuning techniques, a tree-structured Parzen Estimators (TPE) based technique.

With distinct sets of hyper-parameters values selected based on one or more of these techniques, each machine learning algorithm variant is trained on a training data set. A test data set is used as an input to the trained model for calculating the predicted result values. The predicted result values are compared with the corresponding label values to determine the performance score. The performance score may be computed based on calculating the error rate of predicted results in relation to the corresponding labels. For example, in a categorical domain, if out of 10,000 inputs to the model, only 9,000 matched the labels for the inputs, then the performance score is computed to be 90%. In non-categorical domains, the performance score may be further based on a statistical aggregation of the difference between the label value and the predicted result value.

The term "trial" refers herein to the training of a machine learning algorithm using a distinct set of hyper-parameter values and testing the machine learning algorithm using at least one test data set. In an implementation, cross-validation techniques, such as k-fold cross-validation, are used to create many pairs of training and test datasets from an original training data set. Each pair of data sets together contains the original training data set, but the pairs partition the original data set in different ways between a training data set and a test data set. For each pair of data sets, the training data set is used to train a model based on the selected set of hyperparameters, and the corresponding test data set is used for calculating the predicted result values with the trained model. Based on inputting the test data set to the trained machine learning model, the performance score for the pair (or fold) is calculated. If there is more than one pair (i.e., fold), then the performance scores are statistically aggregated (e.g., average, mean, min, max) to yield a final performance score for the variant of the machine learning algorithm.

Each trial is computationally very expensive, as it includes multiple training iterations for a variant of the machine algorithm to generate the performance score for one distinct set of hyper-parameter values of the machine learning algorithm. Accordingly, reducing the number of trials can dramatically reduce the necessary computational resources (e.g., processor time and cycles) for tuning.

Furthermore, since the performance scores are generated to select the most accurate algorithm variant, the more precise the performing score itself is, the more precise the generated model's prediction relative accuracy is compared to other variants. Indeed, once the machine learning algorithm and its hyper-parameter value-based variant are selected, a machine model is trained by applying the algorithm variant to the full training data set using the techniques discussed above. This generated machine-learning model is expected to predict the outcome with more accuracy than the machine-learning models of any other variant of the algorithm.

The precision of the performance score itself depends on how much computational resources are spent on tuning hyper-parameters for an algorithm. Computational resources can be wasted on testing sets of hyper-parameter values that cannot yield the desired accuracy of the eventual model.

Similarly, less (or no) computational resources may be spent on tuning those hyper-parameters for a type of algorithm that is most likely to be less accurate than another type of algorithm. Accordingly, the number of trials may be reduced or eliminated for hyper-parameters of discounted algorithms, thus substantially increasing the performance of the computer system.

Software Overview

Figure 8:
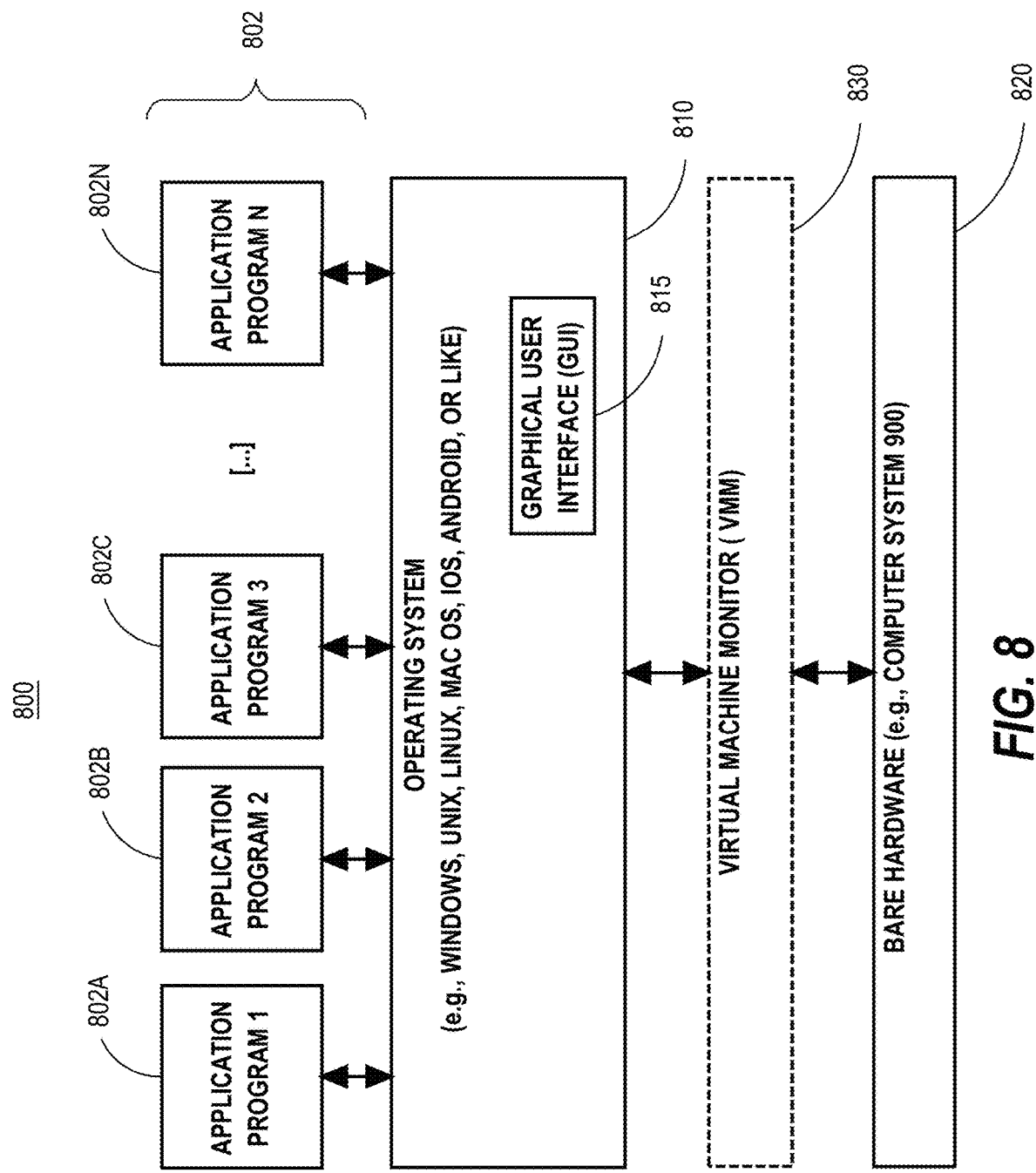
FIG. 8 is a block diagram of a basic software system, in one or more embodiments.
Figure 9:
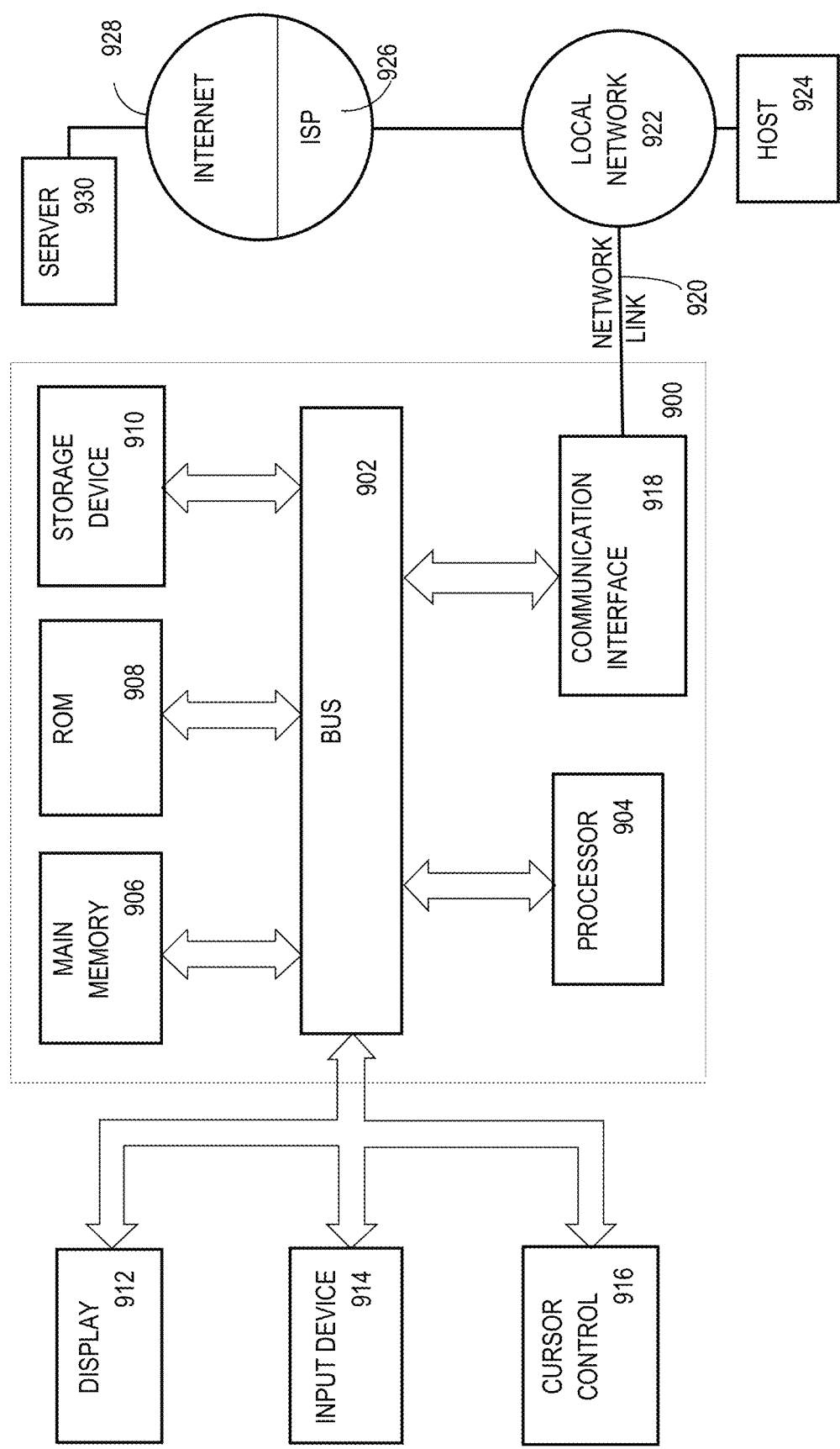
FIG. 9 is a block diagram that illustrates a computer system upon which an embodiment of the invention may be implemented.

FIG. 8 is a block diagram of a basic software system 800 that may be employed for controlling the operation of computing system 900 of FIG. 9. Software system 800 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or another online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read-only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    based at least in part on input speech data of an original form, generating, by a teacher machine learning (ML) model, parallel speech data comprising the input speech data of the original form and temporally aligned output speech data of a target form different than the original form;
    wherein the parallel speech data comprises a plurality of parallel speech frame tuples, each parallel speech frame tuple of the plurality of parallel speech frame tuples comprising a respective input speech frame of the original form of the input speech data and a corresponding output speech frame of the target form of the output speech data;
    wherein the respective input speech frame of the original form temporally corresponds to the corresponding output speech frame of the target form and contains a same portion of particular content;
    training a student machine learning algorithm to generate a student machine learning model by providing the parallel speech data generated by the teacher machine learning model to the student machine learning algorithm, at least by:
        providing, to the student machine learning algorithm, the respective input speech frame of the original form of said each parallel speech frame tuple of the plurality of parallel speech frame tuples and a first set of input speech frames of the original form that are temporally before the respective input speech frame to generate a predicted speech frame of the target form, without providing at least one speech frame of the original form that is temporally after the respective input speech frame;
        determining a student loss function at least by comparing the predicted speech frame with the corresponding output speech frame of the target form of the plurality of parallel speech frame tuples;
    based, at least in part, on the student loss function, adjusting one or more parameters of the student machine learning algorithm.

2. The method of claim 1,
    wherein the student machine learning model and the teacher machine learning model are neural networks having a plurality of processing layers;
    wherein the student machine learning model is different from the teacher machine learning model by having a fewer number of layers or a fewer number of parameters.

3. The method of claim 1, wherein the original form is a non-native accented form of speech, and the target form is a native accented form of speech.

4. The method of claim 1, wherein the original form is a noisy form of speech and the target form is a noiseless form of speech.

5. The method of claim 1, wherein the original form is a noisy non-native accented form of speech, and the target form is a noiseless native accented form of speech.

6. The method of claim 1, wherein the teacher machine learning model comprises an encoder machine learning model and a decoder machine learning model, the method further comprising:
    generating, by the encoder machine learning model, a content-based vector set of form-agnostic data having the particular content at least by applying the encoder machine learning model on the input speech data of the original form;
    applying the decoder machine learning model on the content-based vector set, thereby generating the temporally aligned output speech data of the target form.

7. The method of claim 1, wherein the teacher machine learning model comprises an encoder machine learning model and a decoder machine learning model, the method further comprising:
    training the teacher machine learning model to generate the teacher machine learning model at least by training a decoder machine learning algorithm to generate the decoder machine learning model at least by:
        applying the already trained encoder machine learning model on training speech data in the target form to generate a training input content-based vector set of form-agnostic data;
        providing the training input content-based vector set of form-agnostic data to the decoder machine learning algorithm to generate predicted speech data in the target form.

8. The method of claim 7, further comprising:
    determining one or more teacher loss functions of the decoder machine learning algorithm by comparing the predicted speech data in the target form with training speech data in the target form;
    based, at least in part, on the one or more teacher loss functions of the decoder machine learning algorithm, adjusting one or more parameters of the decoder machine learning algorithm.

9. The method of claim 1, wherein the teacher machine learning model comprises an encoder machine learning model and a decoder machine learning model, the method further comprising:
    training the teacher machine learning model to generate the teacher machine learning model at least by training an encoder machine learning algorithm to generate the decoder machine learning model at least by:
        providing training input speech data in the target form to the encoder machine learning algorithm to generate a predicted content-based vector set of form-agnostic data.

10. The method of claim 9, further comprising:
    determining one or more teacher loss functions of the encoder machine learning algorithm by comparing the predicted content-based vector set of form-agnostic data with content-based data corresponding to the training input speech data in the target form;

based, at least in part, on the one or more teacher loss functions of the encoder machine learning algorithm, adjusting one or more parameters of the encoder machine learning model.

11. The method of claim 9, further comprising:
providing training input speech data in the original form to the encoder machine learning algorithm to generate the predicted content-based vector set of form-agnostic data.

12. The method of claim 11, further comprising:
determining one or more teacher loss functions of the encoder machine learning algorithm by comparing the predicted content-based vector set of form-agnostic data with content-based data corresponding to the training input speech data in the target form and to the training input speech data in the original form;
based, at least in part, on the one or more teacher loss functions of the encoder machine learning algorithm, adjusting one or more parameters of the encoder machine learning algorithm.

13. A system comprising one or more processors and one or more storage media storing one or more computer programs that include instructions, which, when executed by the one or more processors, cause:
based at least in part on input speech data of an original form, generating, by a teacher machine learning (ML) model, parallel speech data comprising the input speech data of the original form and temporally aligned output speech data of a target form different than the original form;
wherein the parallel speech data comprises a plurality of parallel speech frame tuples, each parallel speech frame tuple of the plurality of parallel speech frame tuple comprising a respective input speech frame of the original form of the input speech data and a corresponding output speech frame of the target form of the output speech data;
wherein the respective input speech frame of the original form temporally corresponds to the corresponding output speech frame of the target form and contains a same portion of particular content;
training a student machine learning algorithm to generate a student machine learning model by providing the parallel speech data generated by the teacher machine learning model to the student machine learning algorithm, at least by:
providing, to the student machine learning algorithm, the respective input speech frame of the original form of said each parallel speech frame tuple of the plurality of parallel speech frame tuples and a first set of input speech frames of the original form that are temporally before the respective input speech frame to generate a predicted speech frame of the target form, without providing at least one speech frame of the original form that is temporally after the respective input speech frame;
determining a student loss function at least by comparing the predicted speech frame with the corresponding output speech frame of the target form of the plurality of parallel speech frame tuples;
based, at least in part, on the student loss function, adjusting one or more parameters of the student machine learning algorithm.

14. The system of claim 13,
wherein the student machine learning model and the teacher machine learning model are neural networks having a plurality of processing layers;
wherein the student machine learning model is different from the teacher machine learning model by having a fewer number of layers or a fewer number of parameters.

15. The system of claim 13, wherein the original form is a non-native accented form of speech, and the target form is a native accented form of speech.

16. The system of claim 13, wherein the original form is a noisy form of speech and the target form is a noiseless form of speech.

17. The system of claim 13, wherein the teacher machine learning model comprises an encoder machine learning model and a decoder machine learning model, and wherein the one or more programs include instructions, which, when executed by the one or more processors, further cause:
generating, by the encoder machine learning model, a content-based vector set of form-agnostic data having the particular content at least by applying the encoder machine learning model on the input speech data of the original form;
applying the decoder machine learning model on the content-based vector set, thereby generating the temporally aligned output speech data of the target form.

18. The system of claim 13, wherein the teacher machine learning model comprises an encoder machine learning model and a decoder machine learning model, and wherein the one or more programs include instructions, which, when executed by the one or more processors, further cause:
training the teacher machine learning model to generate the teacher machine learning model at least by training a decoder machine learning algorithm to generate the decoder machine learning model at least by:
applying the already trained encoder machine learning model on training speech data in the target form to generate a training input content-based vector set of form-agnostic data;
providing the training input content-based vector set of form-agnostic data to the decoder machine learning algorithm to generate predicted speech data in the target form.

19. One or more non-transitory computer-readable media storing a set of instructions, wherein the set of instructions includes instructions, which, when executed by one or more hardware processors, cause:
based at least in part on input speech data of an original form, generating, by a teacher machine learning (ML) model, parallel speech data comprising the input speech data of the original form and temporally aligned output speech data of a target form different than the original form;
wherein the parallel speech data comprises a plurality of parallel speech frame tuples, each parallel speech frame tuple of the plurality of parallel speech frame tuple comprising a respective input speech frame of the original form of the input speech data and a corresponding output speech frame of the target form of the output speech data;
wherein the respective input speech frame of the original form temporally corresponds to the corresponding output speech frame of the target form and contains a same portion of particular content;
training a student machine learning algorithm to generate a student machine learning model by providing the parallel speech data generated by the teacher machine learning model to the student machine learning algorithm, at least by:

providing, to the student machine learning algorithm, the respective input speech frame of the original form of said each parallel speech frame tuple of the plurality of parallel speech frame tuples and a first set of input speech frames of the original form that are temporally before the respective input speech frame to generate a predicted speech frame of the target form, without providing at least one speech frame of the original form that is temporally after the respective input speech frame;

determining a student loss function at least by comparing the predicted speech frame with the corresponding output speech frame of the target form of the plurality of parallel speech frame tuples;

based, at least in part, on the student loss function, adjusting one or more parameters of the student machine learning algorithm.

20. The non-transitory computer-readable media of claim 19, wherein the student machine learning model and the teacher machine learning model are neural networks having a plurality of processing layers;

wherein the student machine learning model is different from the teacher machine learning model by having a fewer number of layers or a fewer number of parameters.

* * * * *